(12) United States Patent
Cragun et al.

(10) Patent No.: US 7,093,199 B2
(45) Date of Patent: Aug. 15, 2006

(54) DESIGN ENVIRONMENT TO FACILITATE ACCESSIBLE SOFTWARE

(75) Inventors: Brian John Cragun, Rochester, MN (US); Timothy Jude O'Keefe, Rochester, MN (US); Brian Owen Wood, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 10/140,493

(22) Filed: May 7, 2002

(65) Prior Publication Data

US 2003/0210266 A1    Nov. 13, 2003

(51) Int. Cl.
G06F 13/00 (2006.01)
G06F 3/00 (2006.01)
(52) U.S. Cl. ............... 715/763; 715/762; 715/967
(58) Field of Classification Search .......... 715/763, 715/771, 967, 810, 835; 717/105, 113
See application file for complete search history.

(56) References Cited

U.S. PATENT DOCUMENTS

| | | | | |
|---|---|---|---|---|
| 4,813,013 A | * | 3/1989 | Dunn ..................... | 715/763 |
| 5,623,592 A | * | 4/1997 | Carlson et al. ........ | 715/866 |
| 6,025,836 A | * | 2/2000 | McBride ................ | 715/750 |
| 6,112,015 A | * | 8/2000 | Planas et al. .......... | 709/223 |
| 6,307,547 B1 | * | 10/2001 | Bolnick ................. | 715/775 |
| 6,425,121 B1 | * | 7/2002 | Phillips ................. | 717/109 |
| 6,545,689 B1 | * | 4/2003 | Tunli .................... | 715/719 |
| 2003/0004946 A1 | * | 1/2003 | VanDenAvond et al. | 707/9 |
| 2003/0052927 A1 | * | 3/2003 | Barksdale et al. ..... | 345/854 |
| 2004/0027624 A1 | * | 2/2004 | Parulski et al. ....... | 358/527 |

\* cited by examiner

*Primary Examiner*—Kieu D. Vu
(74) *Attorney, Agent, or Firm*—Patterson & Sheridan,LLP (57) ABSTRACT

The present invention generally is directed to a method of associating a label with a component in a graphical user interface panel. The method comprises: displaying an image of the panel containing an image of the component and an image of the label; receiving a set of user inputs selecting the image of the component, the image of the label, and a predefined user action configured to associate the label with the component; and associating the label with the component in response to the set of user inputs.

29 Claims, 4 Drawing Sheets

DESIGN ENVIRONMENT TO FACILITATE ACCESSIBLE SOFTWARE

BACKGROUND OF THE INVENTION

1. Field of the Invention

The present invention generally relates to a graphical user interface, and more specifically, to a tool for building a graphical user interface.

2. Description of the Related Art

Early computer systems used command-based operating systems and software applications. These command-based systems provided a user interface that required the user to memorize a relatively large number of commands in order to perform meaningful work. The user interfaces for these command-driven computer programs required a relatively high level of skill to operate, and were not considered to be "user-friendly." With the introduction of the IBM personal computer (PC), computers became more widely available, both in the workplace and in homes, and the computer industry soon recognized the need to provide more user-friendly interfaces to computer programs. As a result, many different operating systems were introduced that provided a graphical user interface (GUI), including IBM's OS/2, Microsoft Windows, and the Apple Macintosh. Software applications with graphical user interfaces soon followed, and the vast majority of computer programs running on personal computers today provide a user-friendly graphical user interface.

Most graphical user interfaces provide many common features. The basic display area in a graphical user interface is known as a window or panel. For the discussion in this patent application, a basic display area is referred to as a panel, recognizing that other terms are known in the art to describe display areas. A single panel may fill the entire display, or the display can be split into a number of different panels. A panel may include a number of different "components", which are different areas that display text, drop-down lists, text entry fields, buttons, etc. A pointing device such as a trackball or a mouse is generally used to select various commands and options on a panel by clicking on the appropriate fields or buttons within the panel. In addition, a keyboard is commonly used to enter text information into a panel.

Despite the accessibility of GUI content and components to most users, without special enhancements, GUI's, and IT generally, remain largely inaccessible to visually impaired users. Recently, section 508 of the Rehabilitation Act Amendments of 1998 requires all United States federal agencies to make their information technology accessible to their employees and customers with disabilities. That is, all new IT equipment and services purchased by federal agencies must be accessible. This rule applies to all electronic equipment used in federal agencies (not just workstations). The law also gives federal employees and members of the public the right to sue if the government agency does not provide comparable access to the information and data available to people without disabilities. All state agencies that receive federal funds under the Assistive Technology Act of 1998 are also required to comply with section 508 requirements.

Since the federal government is a major client for many computer companies, significant effort has been spent in developing accessibility aids to facilitate computer operation by disabled users. One example of an accessibility aid that enables disabled user, i.e., a visually impaired user, to use a computer is a "screen reader utility," which reads information displayed on a video display to the visually impaired user. These screen reader utilities operate by intercepting and analyzing information sent to the video driver. That is, when an application program wants to display information on the video display, it sends the information to a video driver, which is responsible for displaying the information on the video display. For example, when an application program wants to display a character, such as an ASCII character, the program sends an ASCII character code to the video driver indicating which character of the ASCII character set to display on the video display. The screen reader intercepts this ASCII character code, determines the phonetic sounds associated with the ASCII character, and audibly outputs the phonetic sounds to the visually impaired user, so that the visually impaired user can perceive the character written to the video display. An example of a screen reader is the Home Page Reader® (HPR) by International Business Machines, Inc. of Armonk, N.Y. HPR uses text-to-speech processing and is configured to read the content of a web page to the visually impaired user through a set of speakers.

As a result, many visually impaired users use screen readers to read graphical user interface panel components, such as, text entry fields. A graphical user interface panel that is accessible for visually impaired users typically includes a label associated with the panel and the components contained therein. The label is configured to textually describe the panel or component associated to it. Thus, at run time, when a visually impaired user places a cursor on a component, the screen reader will read out loud the label associated with that panel or component. In this manner, the visually impaired user is able to perceive the component.

The association between the panel or component and the label is typically made using an Application Programming Interface ("API"). For instance, in Java, a developer has to manually call an API to associate the label with the component. Manually programming these API calls, however, can be tedious.

Moreover, often times, the developer fails to associate a label with a panel or component. When a visually impaired user places a cursor on that panel or component, the screen reader will not be able to read anything. Consequently, the visually impaired is left unaware of the panel or component, and thus is unable to perceive the panel or component.

Accordingly, a need exists therefore for an improved method and apparatus for associating a panel and the components contained therein with their respective labels.

SUMMARY OF THE INVENTION

The present invention generally is directed to a method of associating a label with a component in a graphical user interface panel. The method comprises: displaying an image of the panel containing an image of the component and an image of the label; receiving a set of user inputs selecting the image of the component, the image of the label, and a predefined user action configured to associate the label with the component; and associating the label with the component in response to the set of user inputs.

In one embodiment, the present invention is directed to a method of associating a new label to a component in a graphical user interface panel. The method comprises: displaying an image of the panel containing an image of the component; receiving a set of user inputs selecting the image of the component and a predefined user action configured to generate and associate the new label to the component; displaying a request for a description of the new label in response to the predefined user action; receiving the description for the new label; and associating the new label to the component.

In another embodiment, the present invention is directed to a computer readable medium containing a program which, when executed, performs an operation. The operation comprises: displaying an image of the panel containing an image of the component and an image of the label; receiving a set of user inputs selecting the image of the component, the image of the label and a predefined user action configured to associate the label with the component; and associating the label with the component in response to the set of user inputs.

In yet another embodiment, the present invention is directed to a computer readable medium containing a program which, when executed, performs an operation. The operation comprises: displaying an image of the panel containing an image of the component; receiving a set of user inputs selecting the image of the component and a predefined user action configured to generate and associate the new label to the component; displaying a request for a description of the new label in response to the predefined user action; receiving the description for the new label; and associating the new label to the component.

In still another embodiment, the present invention is directed to a computer that comprises a memory containing a program; and a processor which, when executing the program, performs an operation. The operation comprises: displaying an image of the panel containing an image of the component and an image of the label; receiving a set of user inputs selecting the image of the component, the image of the label and a predefined user action configured to associate the label with the component; and associating the label with the component in response to the set of user inputs.

In still yet another embodiment, the present invention is directed to a computer that comprises a memory containing a program; and a processor which, when executing the program, performs an operation. The operation comprises: displaying an image of the panel containing an image of the component; receiving a set of user inputs selecting the image of the component and a predefined user action configured to generate and associate the new label to the component; displaying a request for a description of the new label in response to the predefined user action; receiving the description for the new label; and associating the new label to the component.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention is generally directed to a graphical user interface ("GUI") panel development tool. More specifically, the present invention is directed to a program in the development tool that verifies whether a GUI panel is accessible to visually impaired users. In one embodiment, the program verifies whether each component, including the panel, has been associated with a label. In another embodiment, the program displays to the developer the components that have not been associated with a label. A graphical indication (e.g., an icon) indicating that the component has not been associated with a label may be placed proximate the component. In yet another embodiment, if a label has been provided but has not been associated with a component, then an image of that label may be displayed as being contained in a box with a solid border to indicate that the label has not been associated with a component. On the other hand, a label that has been associated with a component may be displayed as being contained in a box with a dashed border. In still another embodiment, brief descriptions corresponding to the icons are displayed. In yet another embodiment, the program allows the developer to associate a label that has not been associated with a component by selecting the label, the component and an action button configured to associate the label with the component. In still another embodiment, the program allows the developer to add a new label and associate the new label to a component by selecting the component and an action button configured to associate the new label with the component. Once the action button is selected, the developer is given the option to enter a description for the new label.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
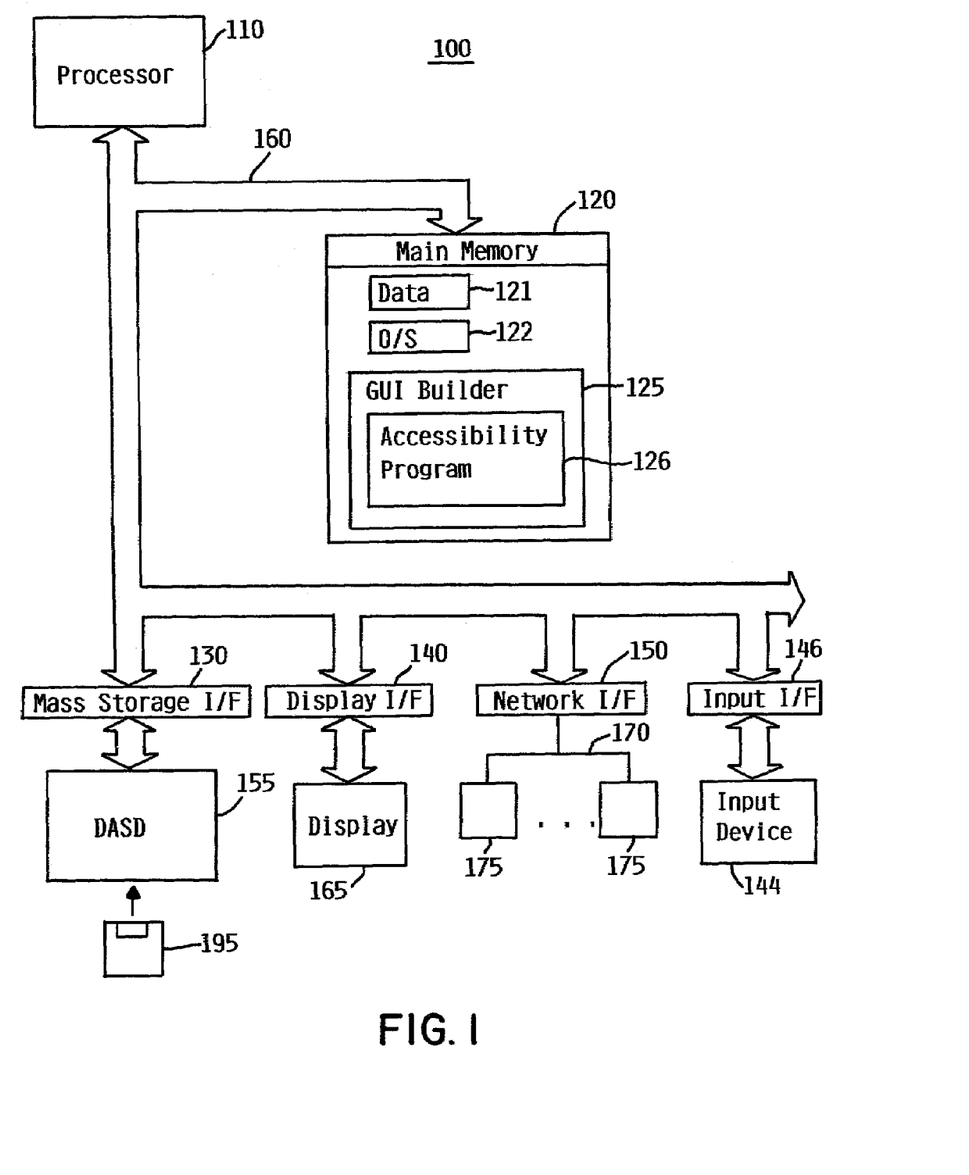
FIG. 1 is a computer system in accordance with an embodiment of the present invention.

Referring now to FIG. 1, a computer system 100 in accordance with an embodiment of the present invention is shown. In one embodiment, the computer system 100 is an enhanced IBM RS/6000 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, the computer system 100 includes a processor 110 connected to a main memory 120, a mass storage interface 130, a display interface 140, and a network interface 150. These system components are interconnected through the use of a system bus 160. The mass storage interface 130 is used to connect mass storage devices (such as a direct access storage device 155) to the computer system 100. One specific type of direct access storage device is a floppy disk drive, which may store data to and read data from a floppy diskette 195. Another specific type of direct access storage device is an optical storage. Although storage 155 is shown as a single unit, it could be any combination of fixed and/or removable storage devices, such as fixed disc drives, floppy disc drives, tape drives, removable memory cards, or optical storage. The main memory 120 and the storage device 155 could be part of one virtual address space spanning multiple primary and secondary storage devices.

The contents of main memory 120 can be loaded from and stored to the storage device 155 as processor 110 has a need for it. Main memory 120 is any memory device sufficiently large to hold the necessary programming and data structures of the invention. The main memory 120 could be one or a combination of memory devices, including random access memory (RAM), non-volatile or backup memory such as programmable or flash memory or read-only memory (ROM). The main memory 120 may be physically located in another part of the computer system 100. While main memory 120 is shown as a single entity, it should be understood that memory 120 may in fact comprise a plurality of modules, and that main memory 120 may exist at multiple levels, from high speed registers and caches to lower speed but larger DRAM chips.

The main memory 120 in accordance with the preferred embodiments contains data 121 (which represents any input or output from a program on the system 100), an operating system 122, a graphical user interface (GUI) panel builder 125, and an accessibility program 126. The computer system 100 utilizes well known virtual addressing mechanisms that allow the programs of the computer system 100 to behave as if they only have access to a large, single storage entity instead of access to multiple, smaller storage entities such as the main memory 120 and DASD device 155. Therefore, while data 121, the operating system 122, the accessibility program 126, and the GUI panel builder 125 are shown to reside in the main memory 120, those skilled in the art will recognize that these items are not necessarily all completely contained in the main memory 120 at the same time. It should also be noted that the term "memory" is used herein to generically refer to the entire virtual memory of the computer system 100.

Figure 2A:
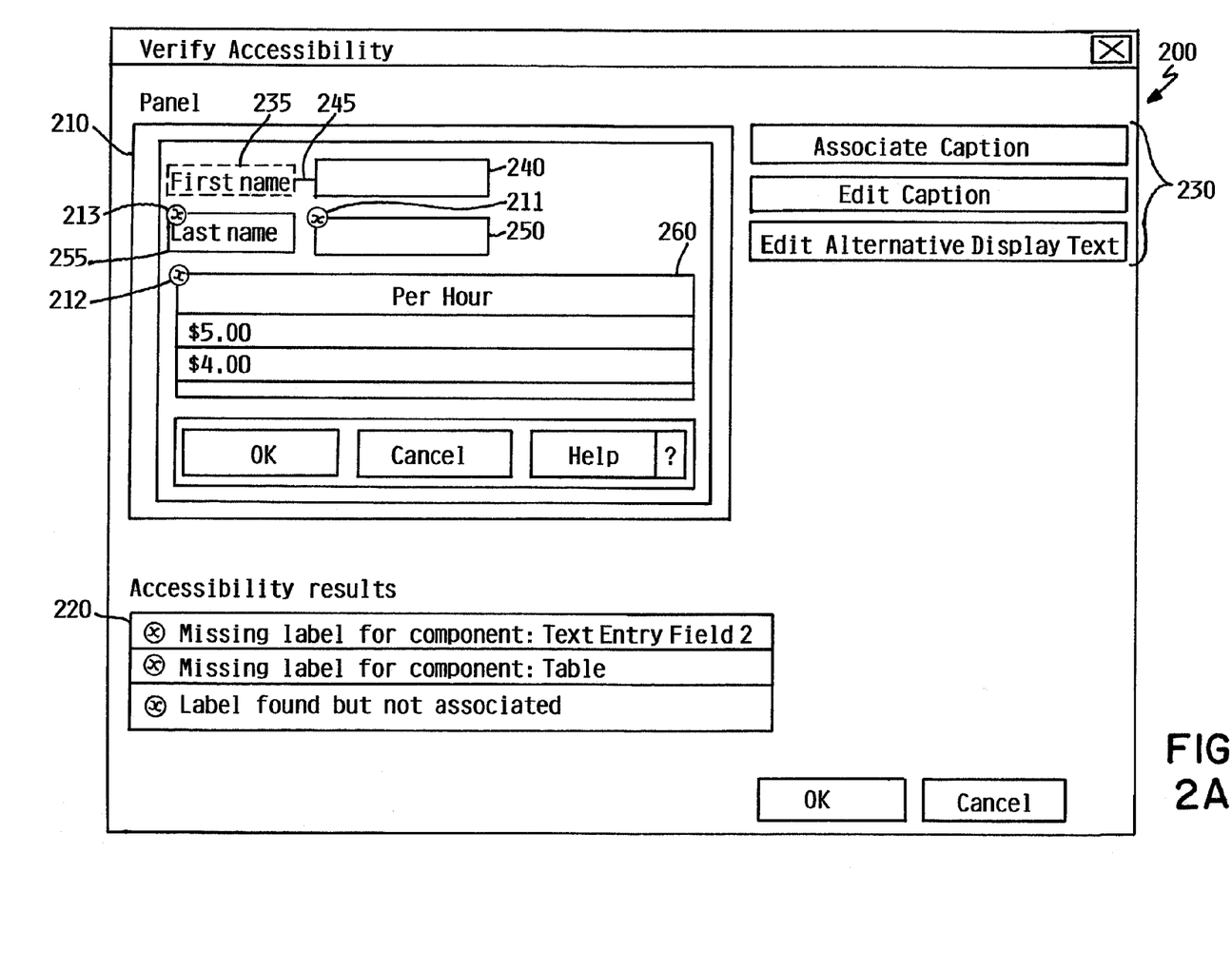
FIGS. 2A and 2B illustrate a graphical user interface in accordance with embodiments of the present invention.
Figure 2B:
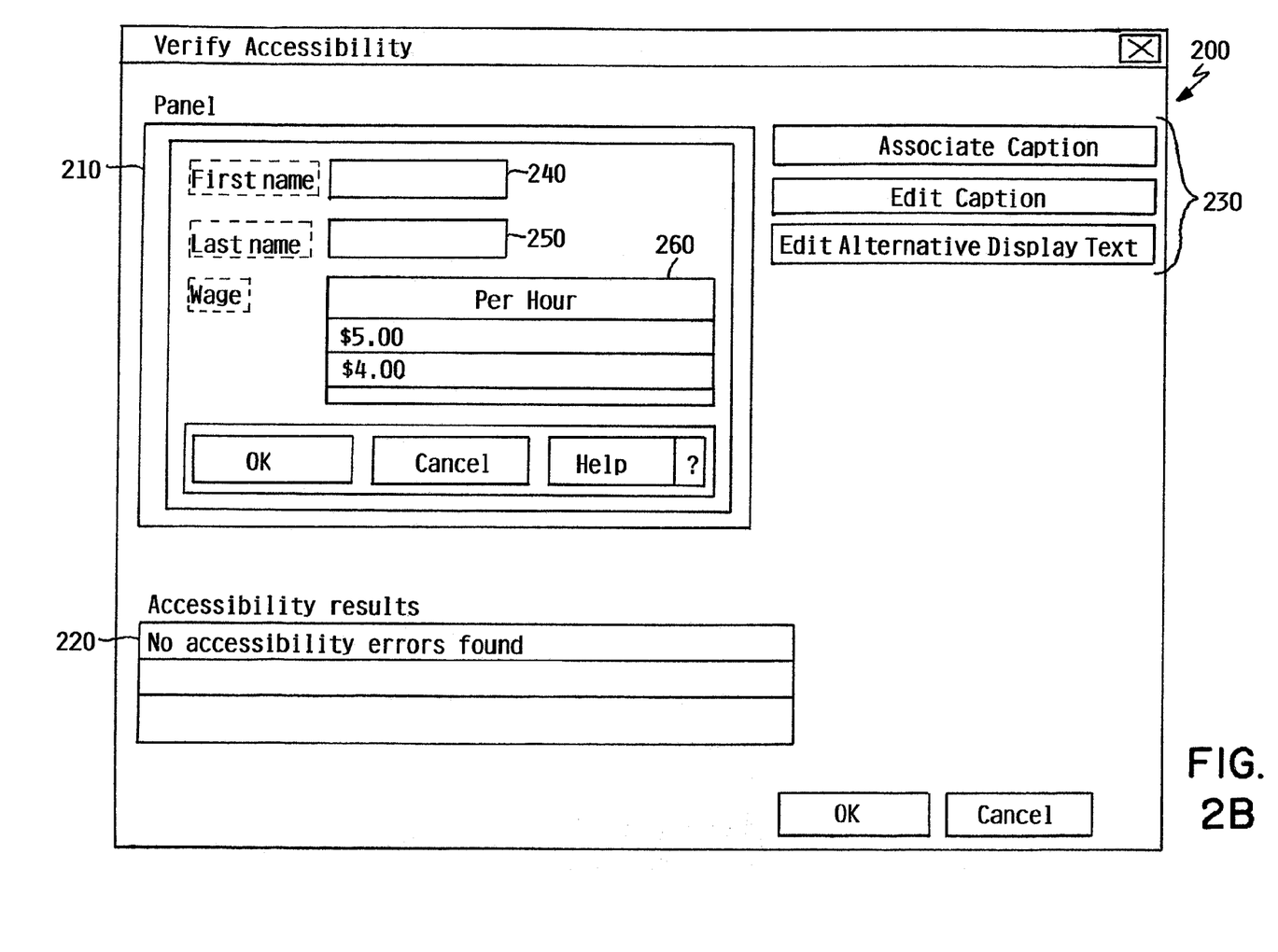

The GUI panel builder 125 is a tool that generates an image of the actual implementation of the GUI panel so as to enable a developer to define or manipulate the look and feel of the GUI panel and the components contained therein. In accordance with an embodiment of the invention, the accessibility program 126 is configured to verify whether each component of a GUI panel, including the panel itself, has been associated with a label. In this context, a label is any information that may be audibly rendered (e.g., via a screen reader) and output (e.g., via some output device). In one embodiment, the accessibility program 126 displays to the developer an image of the panel containing an image of the components and an image of the labels. The accessibility program 126 may also visually indicate to the developer whether each component has been associated with a label. In another embodiment, the accessibility program 126 allows the developer to associate a component with a label without having to manually generate programming codes/API calls. Embodiments illustrating various operations of the accessibility program will be discussed in details with reference to FIGS. 2 and 3.

In general, operating system 122 is a sophisticated program that manages the resources of computer system 100. Some of these resources are processor 110, main memory 120, mass storage interface 130, display interface 140, network interface 150, and system bus 160. In one embodiment, the operating system 122 is a multitasking operating system known in the industry as AIX; however, those skilled in the art will appreciate that the spirit and scope of the present invention is not limited to any one operating system. In another embodiment, the operating system 122 supports an object oriented programming environment such as that provided, for example, by the Java programming language.

Processor 110 may be constructed from one or more microprocessors and/or integrated circuits. Processor 110 executes program instructions stored in main memory 120. When computer system 100 starts up, processor 110 initially executes the program instructions that make up operating system 122.

Although computer system 100 is shown to contain only a single processor and a single system bus, those skilled in the art will appreciate that the present invention may be practiced using a computer system that has multiple processors and/or multiple buses. In addition, the interfaces that are used in one embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165 are used to display information to system administrators and users. Note, however, that while display interface 140 is provided to support communication with one or more displays 165, computer system 100 does not necessarily require a local display 165, because all needed interaction with users and other processes may occur via network interface 150 to displays on remote workstations.

The input interface 146 is used to directly connect the computer system 100 with an input device 144. The input device 144 can be any device to give input to the computer system 100. For example, a keyboard, keypad, light pen, touch screen, button, mouse, track ball, or speech recognition unit could be used. Further, although shown separately from the input device, the terminal display 165 and input device 144 could be combined. For example, a display screen with an integrated touch screen, a display with an integrated keyboard or a speech recognition unit combined with a text speech converter could be used.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

Referring now to FIG. 2A, a graphical user interface 200 in accordance with an embodiment of the present invention is illustrated. When the developer invokes the accessibility program 126, e.g., by selecting an option from a pull down menu or a toolbar, the accessibility program 126 determines whether the panel of interest and the components contained therein are accessible to visually impaired users. The operation of the accessibility program 126 will be discussed in the following paragraphs, particularly with reference to FIG. 3. The result of the determination is then displayed in the graphical user interface 200. In one embodiment, the graphical user interface 200 contains an image of the panel ("panel image") 210 in which the developer is interested (along with an image of the components and the labels contained therein), an accessibility results list 220, and a set of action buttons 230.

Upon invoking the accessibility program 126, a determination or verification is made as to whether each component, including the panel, is associated with a label. In one embodiment, if the component is a graphical component, such as a picture, the label that describes the component is defined as an alternative display text. On the other hand, if the component is a non-graphical component, e.g., such as a text entry field 240, the label that describes the component is defined as a caption text. In one embodiment, every component and its associated label, whether it is a caption text or an alternative display text, is verified.

In accordance with an embodiment of the present invention, the panel image 210 displays a number of icons, such as the icons 211–213. These icons 211–213 are configured to visually indicate to the developer the areas that may have accessibility problem. In one embodiment, the icons 211–213 are illustrated as circles with a cross inside each circle. In another embodiment, the icons 211–213 are placed proximate their respective components. Other symbols, however, may be used to illustrate the icons 211–213.

In accordance with another embodiment of the present invention, the panel image 210 further displays the label that is associated with each component. For instance, "First Name" is the label associated with the text entry field 240. The box with a dashed border 235 containing the label, e.g., "First Name", indicates that the label has been associated with the component, e.g., the text entry field 240. The line 245 drawn between the label, e.g., "First Name", and the component, e.g., the text entry field 240, further indicates the association between the label and the component. In this manner, the developer may easily visually identify which components have been associated with their respective labels.

On the other hand, if a label has been provided but has not been associated, the label, e.g., "Last Name", is displayed inside a box with a solid border 255. The non-existence of a solid line between a text entry field 250 and its label, "Last Name", indicates the absence of association between the component, i.e., the text entry field 250, and its label, e.g., "Last Name." In accordance with one embodiment of the present invention, if a label has not been provided, then only an icon, e.g., icon 212, is illustrated proximate the component, e.g., a table 260. Various embodiments discussed in the previous paragraphs would be applicable regardless whether the label is a caption text or an alternative display text.

In accordance with an embodiment of the present invention, the graphical user interface 200 further contains the accessibility results list 220. The accessibility results list 220 provides a brief description for every icon 211–213 displayed on the panel image 210. For instance, the first line on the list 220 pertains to icon 211 and indicates that text entry field 250 is missing a label. The second line on the list 220 pertains to icon 212 and indicates that the table 260 is missing a label. The third line on the list 220 pertains to icon 213 and indicates that a label, i.e., "Last Name", is found but has not been associated with a component. In one embodiment, when a line containing a brief description in the accessibility results list 220 is selected, the component to which the brief description pertains is also selected. Conversely, in accordance with another embodiment of the present invention, when a component with an icon proximate it is selected, the line containing a brief description of the icon is also selected. These embodiments are provided to assist the developer in identifying which components have accessibility problems, i.e., have not been associated with a label. In another embodiment, the brief descriptions are listed in the order of severity, i.e., the brief description indicating the most severe accessibility problem is displayed first or at the top of the list.

In accordance with another embodiment of the present invention, the GUI 200 also illustrates a set of action buttons 230. When one of these buttons 230 is selected, a set of programming codes, such as programming API calls, is generated to programmatically create or modify the association between a component and its label. The API calls are configured to automatically set the internal data structures and relationships between the component and its label. Instead of having to manually write programming codes to associate each component with its label, the developer simply has to choose which action button to select. In this manner, embodiments of the present invention provide a user friendly environment for developers to create and modify associations between components and their respective labels. The set of action buttons 230 may be represented in various implementations, such as buttons on a tool bar or selectable options on a pull-down menu.

In one embodiment, the set of action buttons 230 includes an Associate Caption button, an Edit Caption button and an Edit Alternative Display Text button. The Associate Caption button is configured to associate a label that has been provided but has not been associated with a component. That is, when the label, the component, and the Associate Caption button are selected, the label is associated with the component. For instance, when the label "Last Name", its respective component, i.e., text entry field 250, and the Associate Caption button are selected, the label "Last Name" is associated with text entry field 250, as illustrated in FIG. 2B.

In accordance with another embodiment, the set of action buttons 230 is configured to generate a new label and associate that new label to its respective component. In one embodiment, the set of action buttons 230 is configured to modify a description of a label that is already associated with a component. In one embodiment, when the developer desires to generate a new label that is to be associated to a component, the developer simply selects the component and either the Edit Caption button, if the label is a caption text, or the Edit Alternative Display Text button, if the label is an alternative display text, and provides a description for the new label. In one embodiment, when either the Edit Caption button or the Edit Alternative Display Text button is selected, the GUI 200 displays a window for the developer to input the description for the new label. For instance, when the table 260 and the Edit Caption button are selected, and the developer inputs "Wage" as the description for a new label to be associated with the table 260, the new label "Wage" is associated with the table 260, as illustrated in FIG. 2B.

Figure 3:
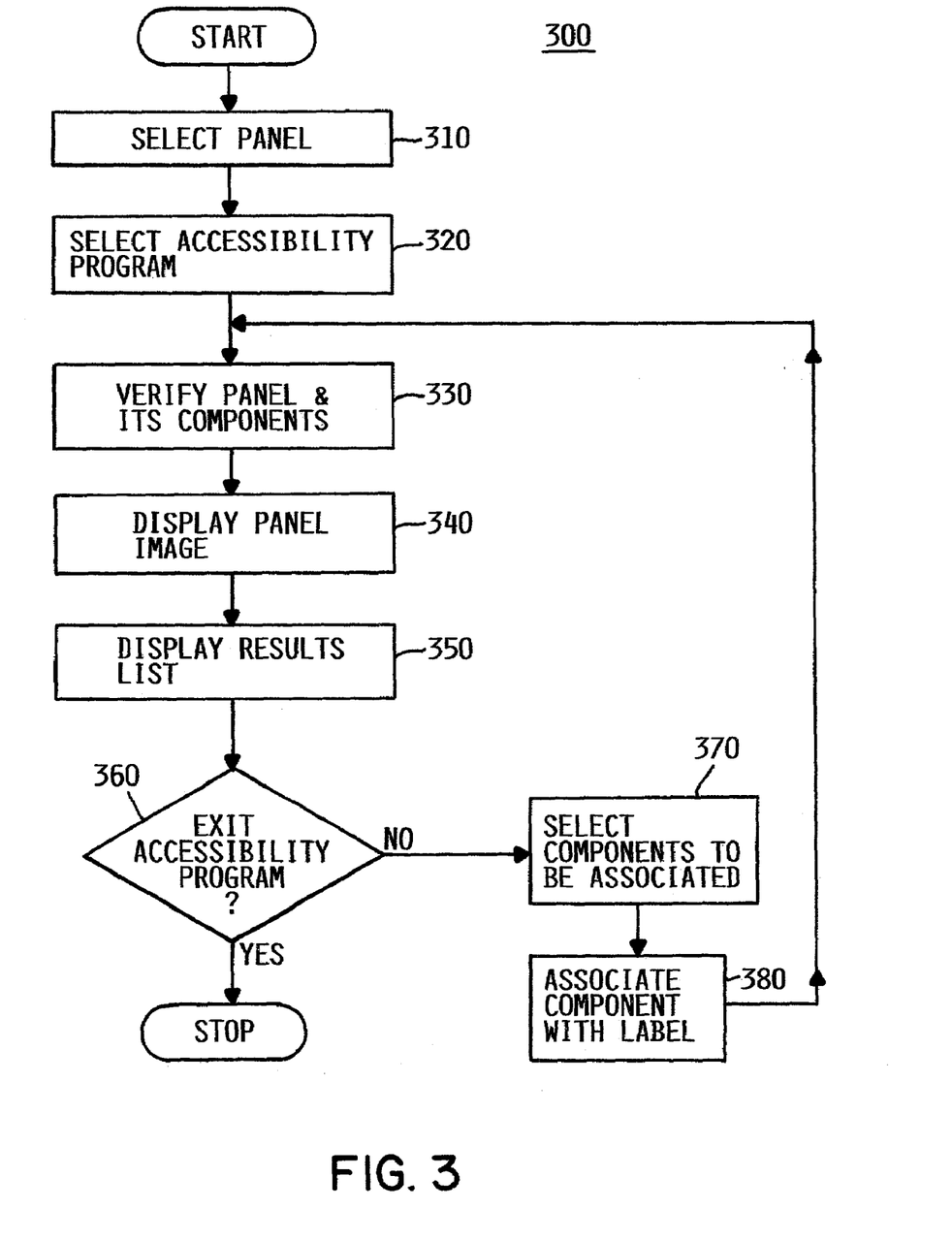
FIG. 3 illustrates a process for associating labels with their respective components in accordance with an embodiment of the present invention.

FIG. 3 illustrates a process 300 for associating labels with their respective components in accordance with an embodiment of the present invention. At step 310, a user input selecting a particular GUI panel of interest is received by the GUI builder 125. At step 320, a user input selecting an accessibility mode, which invokes the accessibility program 126 is received by the GUI builder 125. Upon invoking the accessibility program 126, the accessibility program 126 verifies or determines whether each component, including the panel, has been associated with a label (at step 330). After the verification process is complete, an image of the particular panel of interest, e.g., the panel image 210, (along with an image of the components and the labels contained therein) is displayed at step 340. As previously described, the panel image includes a number of icons, e.g., icons 211–213, which visually indicate to the developer the components, including the panel, with accessibility problem, i.e., have not been associated with a label. Labels that have not been associated with their respective components may be displayed inside the panel image as being contained in boxes with a dashed border. The panel image may additionally include a line drawn between the image of the label that has been associated with a component and the image of the component to indicate the association between the label and the component.

In addition to the panel image, an accessibility results list, e.g., the accessibility results list 220, is also displayed at step 350. As described earlier, the accessibility results list provides a brief description of every icon displayed in the panel image. After seeing the panel image with all its accessibility problems, as indicated by the icons and the accessibility results list, the developer has a choice of ending the process 300 or correcting the accessibility problems. Thus, at step 360, a determination is made as to whether a user input is received indicating the process 300 to end, i.e., closing the accessibility program 126. If so, then the process 300 ends and the GUI builder 125 exits out of the accessibility mode.

On the other hand, if the developer desires to correct the accessibility problems, then a set of user inputs selecting the label and the component to be associated will be received (step 370), followed by a user input selecting the particular action button (step 380). For instance, if the developer desires to associate the label "Last Name" with the text entry field 250, the developer will select the label "Last Name" and the text entry field 250. Then, the developer will select the Associate Caption button to associate "Last Name" with the text entry field 250. If the developer desires to add the label "Wage" to the table 260, the developer will select the table 260 and the Edit Caption button. The developer will then be given the option to enter "Wage" as the description for the label. After step 380, processing returns to step 330 at which the verification process is repeated. In one embodiment, the panel image and the accessibility results list are refreshed (i.e., the prior panel image and the accessibility results list are discarded) prior to displaying a new panel image at step 340 and a new accessibility results list at step 350. In this manner, the panel image and accessibility results list remain current. In another embodiment, the process 300 continues until a user input selecting to end the process 300 is received.

While the foregoing is directed to embodiments of the present invention, other and further embodiments of the invention may be devised without departing from the basic scope thereof, and the scope thereof is determined by the claims that follow.

What is claimed is:

1. A method of associating a label with a component in a graphical user interface panel, comprising:
   displaying an image of the panel containing an image of the component and an image of the label;
   receiving a set of user inputs selecting the image of the component, the image of the label and a predefined user action configured to associate the label with the component;
   associating the label with the component in response to the set of user inputs, wherein the label is a description of the component and is readable by a screen reader, the screen reader being a software component configured to audibly read the description in response to user interaction with the component; and
   visually differentiating, in the graphical user interface panel, those components having an associated label from those components lacking an associated label, wherein visually differentiating comprises displaying at least one indicator to visually indicate whether the label has been associated with the component, wherein displaying the at least one indicator comprises at least one of:
   displaying the label in a box with a solid border to indicate that the label has not been associated with the component; and
   displaying an icon proximate one of the image of the component and the image of the label, the icon indicating that the label has not been associated with the component.

2. The method of claim 1, wherein the predefined user action is configured to generate a set of programming codes for associating the label with the component.

3. The method of claim 1, further comprising prior to displaying the image of the panel, determining whether the label has been associated with the component.

4. The method of claim 1, further comprising
   displaying a brief description for the icon.

5. The method of claim 1, wherein the at least one indicator further comprises displaying the image of the label in a box with a dashed border to indicate that the label has been associated with the component.

6. The method of claim 1, wherein the at least one indicator further comprises displaying the image of the label in a box with a dashed border connected by a solid line between the image of the label and the image of the component to indicate that the label has been associated with the component.

7. The method of claim 1, wherein the label is one of a caption text and an alternative display text.

8. The method of claim 1, wherein the label is a caption text if the component is a non-graphical component.

9. The method of claim 1, wherein the label is an alternative display text if the component is a graphical image component.

10. A method of associating a new label to a component in a graphical user interface panel, comprising:
   displaying an image of the panel containing an image of the component;
   receiving a set of user inputs selecting the image of the component and a predefined user action configured to generate and associate the new label to the component, wherein the new label is a description of the component and is readable by a screen reader, the screen reader being a software component configured to audibly read the description in response to user interaction with the component;
   displaying a request for a description of the new label in response to the predefined user action;
   receiving the description for the new label;
   associating the new label to the component; and
   visually differentiating, in the graphical user interface panel, those components having an associated new label from those components lacking an associated new label, wherein visually differentiating comprises displaying at least one indicator to visually indicate whether the new label has been associated with the component, wherein displaying the at least one indicator comprises at least one of:
   displaying the new label in a box with a solid border to indicate that the new label has not been associated with the component; and
   displaying an icon proximate the image of the component, the icon indicating that the component has not been associated with the label.

11. The method of claim 10, further comprising prior to displaying the image of the panel, determining whether the component has been associated with a label.

12. A computer readable storage medium containing a program which, when executed, performs an operation of associating a label with a component in a graphical user interface panel, the operation comprising:
   displaying an image of the panel containing an image of the component and an image of the label, wherein the label is a description of the component and is readable by a screen reader, the screen reader being a software component configured to audibly read the description in response to user interaction with the component;
   receiving a set of user inputs selecting the image of the component, the image of the label and a predefined user action configured to associate the label with the component;
   associating the label with the component in response to the set of user inputs; and
   visually differentiating, in the graphical user interface panel, those components having an associated label from those components lacking an associated label, wherein visually differentiating comprises displaying at least one indicator to visually indicate whether the label has been associated with the component, wherein displaying the at least one indicator comprises at least one of:
   displaying the label in a box with a solid border to indicate that the label has not been associated with the component; and
   displaying an icon proximate the image of the component, the icon indicating that the component has not been associated with the label.

13. The computer readable storage medium of claim 12, wherein the predefined user action is configured to generate a set of programming codes for associating the label with the component.

14. The computer readable storage medium of claim 12, wherein the operation further comprises prior to displaying the image of the panel, determining whether the label has been associated with the component.

15. The computer readable storage medium of claim 12, wherein visually differentiating further comprises:
   displaying a brief description for the icon.

16. The computer readable storage medium of claim 12, wherein the at least one indicator further comprises displaying the image of the label in a box with a dashed border to indicate that the label has been associated with the component.

17. The computer readable storage medium of claim 12, wherein the at least one indicator further comprises displaying the image of the label in a box with a dashed border connected by a solid line between the image of the label and the image of the component to indicate that the label has been associated with the component.

18. The computer readable storage medium of claim 12, wherein the label is one of a caption text and an alternative display text.

19. The computer readable storage medium of claim 12, wherein the label is a caption text if the component is a non-graphical component.

20. The computer readable storage medium of claim 12, wherein the label is an alternative display text if the component is a graphical image component.

21. A computer readable storage medium containing a program which, when executed, performs an operation of associating a new label with a component in a graphical user interface panel, the operation comprising:
   displaying an image of the panel containing an image of the component;
   receiving a set of user inputs selecting the image of the component and a predefined user action configured to generate and associate the new label to the component, wherein the new label is a description of the component and is readable by a screen reader, the screen reader being a software component configured to audibly read the description in response to user interaction with the component;
   displaying a request for a description of the new label in response to the predefined user action;
   receiving the description for the new label;
   associating the new label to the component; and
   visually differentiating, in the graphical user interface panel, those components having an associated new label from those components lacking an associated new label, wherein visually differentiating comprises displaying at least one indicator to visually indicate whether the new label has been associated with the component, wherein displaying the at least one indicator comprises at least one of:

displaying the new label in a box with a solid border to indicate that the new label has not been associated with the component; and displaying an icon proximate the image of the component, the icon indicating that the component has not been associated with the label.

22. The computer readable storage medium of claim 21, wherein the operation further comprises prior to displaying the image of the panel, determining whether the component has been associated with a label.

23. A computer, comprising:

a memory containing a program; and a processor which, when executing the program, performs an operation of associating a label with a component in a graphical user interface panel, the operation comprising:

displaying an image of the panel containing an image of the component and an image of the label, wherein the label is a description of the component and is readable by a screen reader, the screen reader being a software component configured to audibly read the description in response to user interaction with the component;

receiving a set of user inputs selecting the image of the component, the image of the label and a predefined user action configured to associate the label with the component;

associating the label with the component in response to the set of user inputs; and visually differentiating, in the graphical user interface panel, those components having an associated new label from those components lacking an associated new label, wherein visually differentiating comprises displaying at least one indicator to visually indicate whether the new label has been associated with the component, wherein displaying the at least one indicator comprises at least one of:

displaying the new label in a box with a solid border to indicate that the new label has not been associated with the component.

24. The computer of claim 23, wherein the operation further comprises prior to displaying the image of the panel, determining whether the label has been associated with the component.

25. A computer, comprising:

a memory containing a program; and a processor which, when executing the program, performs an operation of associating a new label with a component in a graphical user interface panel, the operation comprising:

displaying an image of the panel containing an image of the component;

receiving a set of user inputs selecting the image of the component and a predefined user action configured to generate and associate the new label to the component, wherein the new label is a description of the component and is readable by a screen reader, the screen reader being a software component configured to audibly read the description in response to user interaction with the component;

displaying a request for a description of the new label in response to the predefined user action;

receiving the description for the new label;

associating the new label to the component; and visually differentiating, in the graphical user interface panel, those components having an associated new label from those components lacking an associated new label, wherein visually differentiating comprises displaying at least one indicator to visually indicate whether the new label has been associated with the component, wherein displaying the at least one indicator comprises at least one of:

displaying the new label in a box with a solid border to indicate that the new label has not been associated with the component.

26. The computer of claim 25, wherein the operation further comprises prior to displaying the image of the panel, determining whether the component has been associated with a label.

27. A method of associating a label with a component in a graphical user interface panel, comprising:

displaying an image of the panel containing an image of the component and an image of the label;

receiving a set of user inputs selecting the image of the component, the image of the label and a predefined user action configured to associate the label with the component;

associating the label with the component in response to the set of user inputs; and displaying, in the graphical user interface panel, at least one indicator to visually indicate whether the label has been associated with the component, wherein the at least one indicator comprises an icon proximate one of the image of the component and the image of the label, the icon indicating that the label has not been associated with the component.

28. The method of claim 27, wherein displaying the at least one indicator further comprises displaying the image of the label in a box with a dashed border to indicate that the label has been associated with the component.

29. The method of claim 27, wherein the label is a description of the component and is readable by a screen reader, the screen reader being a software component configured to audibly read the description in response to user interaction with the component.

* * * * *